US010681187B2

(12) United States Patent
Murawski

(10) Patent No.: US 10,681,187 B2
(45) Date of Patent: Jun. 9, 2020

(54) DYNAMIC SCHEDULING OF A SINGLE RADIO EXECUTING MULTIPLE WIRELESS PROTOCOLS

(71) Applicant: Silicon Laboratories Inc., Austin, TX (US)

(72) Inventor: Bryan Murawski, Belmont, MA (US)

(73) Assignee: Silicon Laboratories, Inc., Austin, TX (US)

( * ) Notice: Subject to any disclaimer, the term of this patent is extended or adjusted under 35 U.S.C. 154(b) by 152 days.

(21) Appl. No.: 15/842,492

(22) Filed: Dec. 14, 2017

(65) Prior Publication Data

US 2019/0037053 A1 Jan. 31, 2019

Related U.S. Application Data

(60) Provisional application No. 62/538,036, filed on Jul. 28, 2017.

(51) Int. Cl.
| | |
|---|---|
| *G06F 9/46* | (2006.01) |
| *H04L 29/06* | (2006.01) |
| *G06F 9/50* | (2006.01) |
| *G06F 9/48* | (2006.01) |
| *H04W 28/02* | (2009.01) |

(52) U.S. Cl.
CPC ............ *H04L 69/12* (2013.01); *G06F 9/4881* (2013.01); *G06F 9/5083* (2013.01); *H04L 69/18* (2013.01); *H04W 28/02* (2013.01)

(58) Field of Classification Search
CPC ..... H04L 69/12; G06F 9/4881; G06F 9/5083; H04W 28/02
See application file for complete search history.

(56) References Cited

U.S. PATENT DOCUMENTS

| | | | |
|---|---|---|---|
| 2002/0073129 A1* | 6/2002 | Wang .................... | G06F 9/4881 718/102 |
| 2005/0010608 A1* | 1/2005 | Horikawa ............. | G06F 9/4862 |
| 2011/0164500 A1* | 7/2011 | Blomstergren ......... | H04L 47/10 370/235 |

\* cited by examiner

*Primary Examiner* — Camquy Truong
(74) *Attorney, Agent, or Firm* — Nields, Lemack & Frame, LLC

(57) ABSTRACT

A system and method of intelligently scheduling actions from multiple network software stacks is disclosed. The scheduler uses information, such as requested start time, slip time, action duration and priority to schedule actions among a plurality of network stacks. In some embodiments, the scheduler attempts to maximize the radio usage by prioritizing the actions based not only on their given priority, but also based on their duration, and the ability for other actions to tolerate a delay in being performed.

18 Claims, 6 Drawing Sheets

| BLUETOOTH ACTION 1:<br>TRANSMIT<br>PRIORITY 3<br>REQUEST START TIME: NOW<br>ACTION DURATION: 400ms<br>SLIP TIME: 0 | ZIGBEE ACTION 1:<br>TRANSMIT<br>PRIORITY 4<br>REQUEST START TIME: NOW<br>ACTION DURATION: 400ms<br>SLIP TIME: 250 MILLISECONDS |
|---|---|
| BLUETOOTH ACTION 2:<br>RECEIVE<br>PRIORITY 3<br>REQUEST START TIME: NOW<br>ACTION DURATION: 100ms<br>SLIP TIME: 200 MILLISECONDS | ZIGBEE ACTION 2:<br>RECEIVE<br>PRIORITY 3<br>REQUEST START TIME: 800ms<br>ACTION DURATION: 100ms<br>SLIP TIME: 200 MILLISECONDS |
| BLUETOOTH ACTION 3:<br>TRANSMIT<br>PRIORITY 3<br>REQUEST START TIME: 100ms<br>ACTION DURATION: 100ms<br>SLIP TIME: 200 MILLISECONDS | ZIGBEE ACTION 3:<br>TRANSMIT<br>PRIORITY 3<br>REQUEST START TIME: 1sec<br>ACTION DURATION: 200ms<br>SLIP TIME: 200 MILLISECONDS |
| BLUETOOTH ACTION 4:<br>RECEIVE<br>PRIORITY 4<br>REQUEST START TIME: 500ms<br>ACTION DURATION: 300ms<br>SLIP TIME: 250 MILLISECONDS | ZIGBEE ACTION 4:<br>RECEIVE<br>PRIORITY 3<br>REQUEST START TIME: 1sec<br>ACTION DURATION: 200ms<br>SLIP TIME: 300 MILLISECONDS |
| <u>100</u> | <u>110</u> |

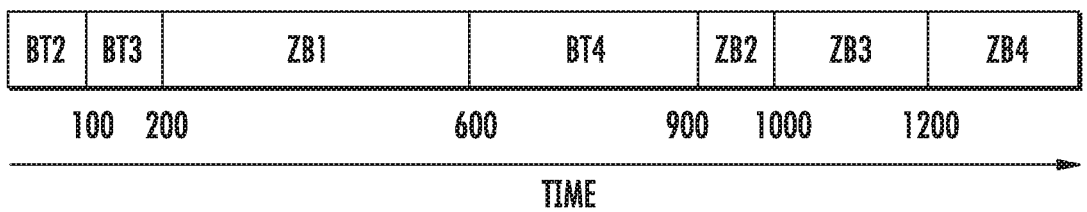

FIG. 5

DYNAMIC SCHEDULING OF A SINGLE RADIO EXECUTING MULTIPLE WIRELESS PROTOCOLS

This application claims priority of U.S. Provisional Application Ser. No. 62/538,036 filed Jul. 28, 2017, the disclosure of which is incorporated herein by reference in its entirety.

FIELD

This disclosure describes systems and methods allowing the operation of multiple network protocols using a single radio.

BACKGROUND

The proliferation of networks has led to challenges for those attempting to design devices that utilize multiple network protocols. For example, WiFi, ZigBee, Thread and Bluetooth Low Energy are all prevalent network protocols. In many situations, more than one type of network protocol is supported by a device. As an example, a mobile phone may have a WiFi interface, a Bluetooth interface, and a cellular interface. Further, most computing devices, including tablets and laptops support at least two different network protocols.

Because of the need to support multiple network protocols with a single device, there is a desire to use a single radio to operate all of these wireless protocols. This minimizes cost, real estate and power.

However, each wireless protocol has its own unique timing requirements. Certain protocols allow a device to fail to respond for long periods of time. For example, ZigBee® utilizes the concept of a sleepy end device, where a device may be in a low power state for several minutes. During this time, it does not respond to any attempts to access it. On the other hand, other protocols have a connection timeout period, wherein if the device does not receive a packet from the sender within that connection timeout period, the connection fails.

Because of these differences in protocol, creating a scheduler that can handle multiple wireless protocols is challenging. It would be beneficial if there were a scheduler that could receive transmit and receive requests from different network protocol stacks, and schedule these requests in an optimal manner.

SUMMARY

A system and method of intelligently scheduling actions from multiple network software stacks is disclosed. The scheduler uses information, such as requested start time, slip time, action duration and priority to schedule actions among a plurality of network software stacks. In some embodiments, the scheduler attempts to maximize the radio usage by prioritizing the actions based not only on their given priority, but also based on their duration, and the ability for other actions to tolerate a delay in being performed.

According to one embodiment, a network controller is disclosed. The network controller comprises a network interface that comprises a radio; a processing unit; and a memory device, in communication with the processing unit, wherein the memory device comprises instructions, which when executed by the processing unit, enable the network controller to: compare actions from a plurality of network software stacks, wherein each action includes a requested start time, an estimated action duration, a slip time, and a priority; select one of the actions from the plurality of network software stacks, based on the requested start time, the estimated action duration, the slip time, and the priority of each action; and schedule the selected action to be executed by the network interface. In certain embodiments, the instructions enable the processing unit to compute a latest allowable start time for a first action by summing the requested start time and the slip time of the first action. In certain embodiments, the instructions enable the processing unit to compare the latest allowable start time of the first action to a sum of the present time and the estimated action duration of a second action. In certain embodiments, the instructions enable the processing unit to schedule the second action before the first action if the sum is less than the latest allowable start time and, if the second action is not scheduled, enable the processing unit to compute a latest allowable start time for the second action by summing the requested start time and the slip time of the second action, and compare the latest allowable start time of the second action to a sum of the present time and the estimated action duration of the first action.

In another embodiment, a method of scheduling actions for a plurality of network software stacks is disclosed. The method comprises comparing actions from a plurality of network software stacks, wherein each action includes a requested start time, an estimated action duration, a slip time, and a priority; selecting one of the actions from the plurality of network software stacks, based on the requested start time, the estimated action duration, the slip time, and the priority of each action; and scheduling the selected action to be executed by the network interface.

In another embodiment, a software program, disposed on a non-transitory storage medium, is disclosed. The software program comprises instructions to compare actions from a plurality of network software stacks, wherein each action includes a requested start time, an estimated action duration, a slip time, and a priority; select one of the actions from the plurality of network software stacks, based on the requested start time, the estimated action duration, the slip time, and the priority of each action; schedule the selected action to be executed by a network interface.

In another embodiment, a network controller is disclosed. The network controller comprises a network interface that comprises a radio; a processing unit; and a memory device, in communication with the processing unit, wherein the memory device comprises instructions, which when executed by the processing unit, enable the network controller to: accept actions from a plurality of network software stacks, wherein each action includes a requested start time, an estimated action duration, a slip time, and a priority; determine that an ongoing action has or will exceed its action duration; check the priority of a second action that is scheduled to execute next; allow the ongoing action to continue if its priority is not less than the priority of the second action; and terminate the ongoing action if its priority is less than the priority of the second action.

In another embodiment, a method of scheduling actions from a plurality of network software stacks is disclosed. The method comprises accepting actions from a plurality of network software stacks, wherein each action includes a requested start time, an estimated action duration, a slip time, and a priority; determining that an ongoing action has or will exceed its action duration; checking the priority of a second action that is scheduled to execute next; allowing the ongoing action to continue if its priority is not less than the priority of the second action; and terminating the ongoing action if its priority is less than the priority of the second action.

In another embodiment, a software program, disposed on a non-transitory storage medium, is disclosed. The software program comprises instructions to accept actions from a plurality of network software stacks, wherein each action includes a requested start time, an estimated action duration, a slip time, and a priority; determine that an ongoing action has or will exceed its action duration; check the priority of a second action that is scheduled to execute next; allow the ongoing action to continue if its priority is not less than the priority of the second action; and terminate the ongoing action if its priority is less than the priority of the second action.

BRIEF DESCRIPTION OF THE DRAWINGS

For a better understanding of the present disclosure, reference is made to the accompanying drawings, in which like elements are referenced with like numerals, and in which:

FIG. 5 illustrates an example of the operation of the scheduler; and

DETAILED DESCRIPTION

Figure 1:
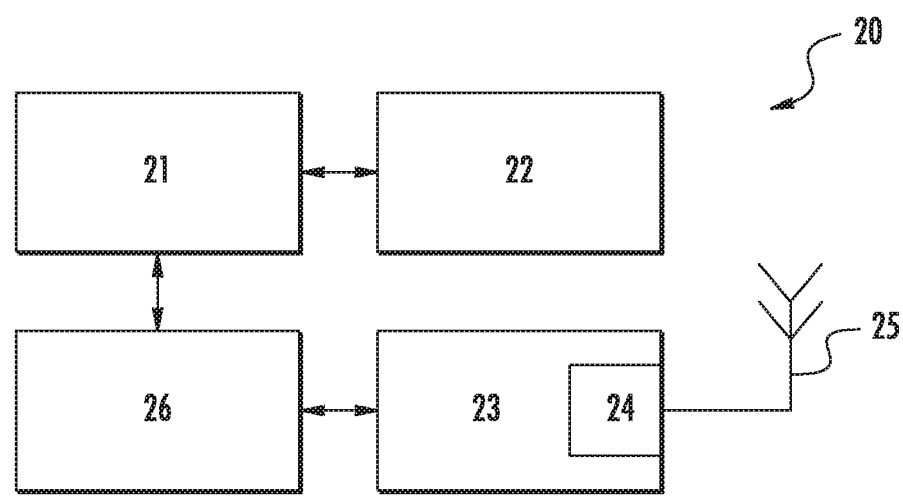
FIG. 1 is a block diagram of the lower-power network controller.

FIG. 1 shows a block diagram of a multi-protocol network controller. Throughout this disclosure, the term "multi-protocol network controller" is used to refer to any controller that utilizes multiple network protocols. In certain embodiments, the network protocols may all operate in the same frequency spectrum, such as WIFI, ZIGBEE®, Thread, Bluetooth®, and Bluetooth Low Energy (BLE). Other network protocols layered on IEEE 802.15.4 would also operate in the same frequency spectrum. It is understood that the techniques and systems described herein are applicable to any frequency spectrum. Furthermore, the present disclosure is also applicable to a radio which is capable of operating at two or more different frequency bands. Thus, the multi-protocol network controller is not limited only to controllers that implement multiple protocols that operate on the same frequency band. Rather, network controllers that implement two or more network protocols that utilize different frequency ranges are also within the scope of the disclosure.

FIG. 1 shows a block diagram of a representative multi-protocol network controller 20. The multi-protocol network controller 20 has a processing unit 21 and an associated memory device 22. This memory device 22 contains the instructions, which, when executed by the processing unit, enable the multi-protocol network controller 20 to perform the functions described herein. This memory device 22 may be a non-volatile memory, such as a FLASH ROM, an electrically erasable ROM or other suitable devices. In other embodiments, the memory device may be a volatile memory, such as a RAM or DRAM. In all embodiments, the memory device 22 is a non-transitory storage medium. The multi-protocol network controller 20 also includes a network interface 23, which is a wireless interface that includes an antenna 25. Additionally, the network interface comprises a radio 24, which may include the baseband processing and lower MAC level processing. The multi-protocol network controller 20 may include a second memory device 26 in which data that is received by the network interface 23, and data that is to be transmitted by the network interface 23, is stored. This second memory device 26 is traditionally a volatile memory. The processing unit 21 has the ability to read and write the second memory device 26 so as to communicate with the other nodes in the networks. Although not shown, each multi-protocol network controller 20 also has a power supply, which may be a battery or a connection to a permanent power source, such as a wall outlet.

Within the multi-protocol network controller 20, there are a plurality of network protocol software stacks. Each software stack is responsible for maintaining a connection to the other devices in the network that utilize that protocol. Additionally, each software stack is responsible for receiving, parsing and responding to incoming packets that are received using that protocol. Each software stack may perform all upper MAC processing. In essence, each network protocol software stack operates independently of the other software stacks. For example, each may have a defined region within the second memory device 26 where incoming and outgoing packets are disposed. These network software stacks are software programs that may be stored in the memory device 22 and executed by the processing unit 21.

However, the multi-protocol network controller 20 only utilizes a single network interface 23. Thus, although the software stacks operate independently of one another, they share common hardware components. In this embodiment, the software stacks share a common resource, specifically, the network interface 23 and its associated radio 24.

Figure 2:
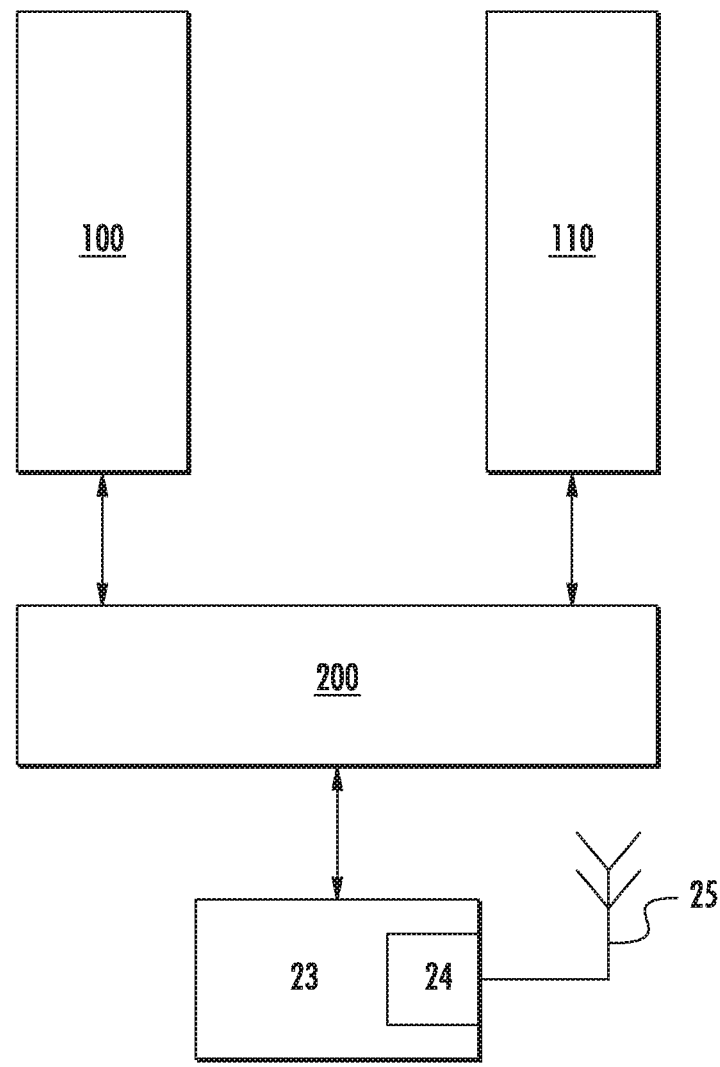
FIG. 2 illustrates the interface between the scheduler and the network protocol software stacks.

FIG. 2 illustrates the interaction between the software stacks and the network interface 23. In this figure, a Bluetooth software stack 100 and a ZigBee software stack 110 exist within the multi-protocol network controller 20. These two software stacks communicate with a scheduler 200, which directs the actions of the network interface 23. Thus, the scheduler 200 resides between the upper MAC (which is disposed within the software stacks) and the lower MAC (which is disposed in the network interface 23). While two software stacks are shown in FIG. 2, it is understood that the disclosure is not limited to this embodiment. Rather, the scheduler 200 can interface with any number of software stacks.

While, in certain embodiments, a single processing unit is used to execute the code associated with the network software stacks and the scheduler, other embodiments are also possible. For example, the code associated with each network software stack may be executed by a dedicated processing unit. Additionally, the code associated with the scheduler 200 may be executed by a processing unit that is different than the processing unit used to execute the code for one or more of the network software stacks. Thus, while the system may be as described in FIG. 1, the scheduler is not limited to operating only in single processing unit environments.

The scheduler 200 is responsible for many functions. First, it is responsible for configuring the network interface 23 for the requested protocol. For example, before the Bluetooth software stack 100 can transmit a packet, the radio 24 must be configured to operate using the wireless parameters associated with the Bluetooth protocol. Similarly, if the Bluetooth software stack wishes to monitor the shared medium (i.e. the air) for incoming packets, the radio 24 must be correctly configured. The scheduler 200 is responsible for this configuration activity.

The scheduler 200 is also responsible for selecting the next operation to be performed from those requested by the software stacks. For example, the Bluetooth software stack 100 may include a list of actions that need to be taken. These actions may include transmitting a message to one or more destinations, configuring the radio to listen for an expected incoming message, and others. For example, BLE is very time sensitive and the Bluetooth software stack 100 schedules transmits at very specific times and also schedules small receive windows at times when it expects an incoming packet. The ZigBee software stack 110 may have a similar list of actions.

In certain embodiments, each software stack is responsible for prioritizing the actions for that particular network protocol. In this case, the scheduler 200 needs to select between the next action that is being requested by each software stack. In other embodiments, the scheduler 200 may select between a larger number of actions that are being requested by each software stack.

Figure 3:
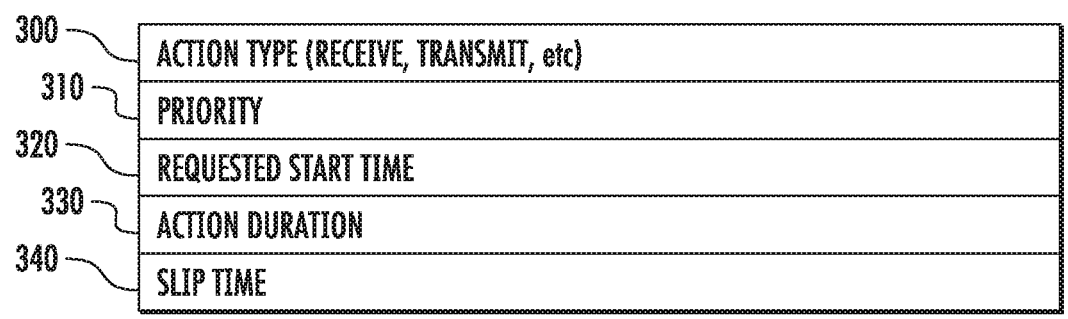
FIG. 3 represents the information provided to the scheduler.

In one embodiment, each network stack is responsible for providing certain information to the scheduler 200. FIG. 3 shows a representation of the information that may be supplied to the scheduler 200, according to one embodiment. One piece of information is the action type 300. Action type 300 may be a transmit request, a receive request, or some other action. The priority 310 indicates the importance of the action. A higher priority indicates that the action is more important than a lower priority action. The requested start time 320 is an indication of when the software stack desires that the action take place. A value of 0 may be used to indicate that the action should take place at the present time. Greater values indicate that the action should be delayed before it takes place. The action duration 330 is an estimation of the amount of time that the requested action will take. For example, the duration of a transmit action may be estimated based on the number of bytes that are to be transmitted and the transmission rate of that network protocol. The slip time 340 is the maximum amount of time that the action may begin after its requested start time. For time critical actions, this value may be zero. In other embodiments, the slip time may be set to a larger number, thereby allowing the scheduler 200 more insight and flexibility in coordinating the various actions.

These pieces of information may be used by the scheduler 200 to intelligently schedule the actions from the multiple software stacks so as to minimize the number of failed attempts.

Assume that the first action has an action duration of 500 milliseconds, a priority of 4, a requested start time of 0 and a slip time of 300 milliseconds. Assume also that the second action has an action duration of 100 milliseconds, a priority of 3, a requested start time of 0 and a slip time of 200 milliseconds.

Typical schedulers use priority to choose between actions to perform. For example, since a first action has a priority of 4, and a second action has a priority of 3, the first action will be scheduled before the second action. However, the inclusion of additional information allows the scheduler to make more intelligent choices.

Looking that the information provided above, it can be seen that the second action can be completed in 0.1 seconds, which is less than the maximum slip time of 0.3 seconds, indicated by the first action. In other words, the second action can be performed prior to the first action, and both will satisfy their timing requirements. However, if the first action is performed first, it completes in 0.5 seconds, which is greater than the maximum slip time of 0.2 seconds, indicated by the second action. Therefore, if the first action is completed first, the second action must fail.

Thus, in one embodiment, the scheduler determines, for a first action, the requested start time 320 and the slip time 340. It then computes the sum of these values to determine a latest allowable start time for the first action. This latest allowable start time of the first action is then compared to the action duration 330 of a second action. If the second action can be completed before the latest allowable start time, the second action is scheduled prior to the first action. In certain embodiments, this scheduling decision is made regardless of the comparative priorities of the two actions. In other words, even though the first action has a higher priority than the second action, the second action is scheduled first.

Stated differently, if (present time+action duration 330 of second action) is less than (requested start time 320+slip time 340 of first action), then the second action is scheduled before the first action. Note that this comparison only needs to be made if the priority of the second action is less than or equal to the priority of the first action. This is because, by default, higher priority actions are scheduled before lower priority actions.

Figure 4:
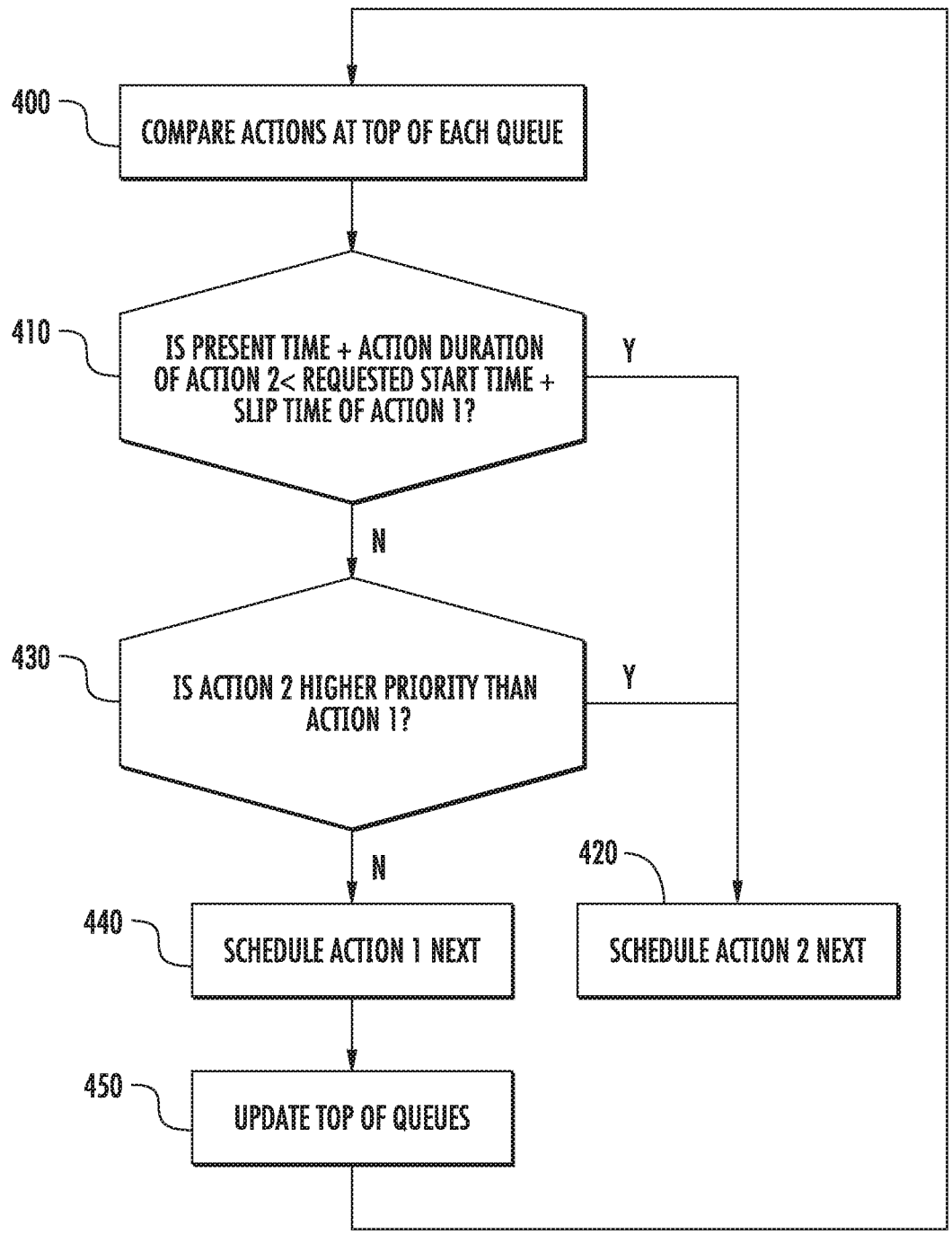
FIG. 4 illustrates a flowchart showing the operation of the scheduler.

This algorithm is shown in FIG. 4. In Process 400, the scheduler 200 compares the Actions that are on top of each queue for each respective network software stack. For this example, assume that the requested Start Time of each Action is the present time. The scheduler 200 then determines whether (present time+action duration 330 of second action) is less than (requested start time 320+slip time 340 of first action), as shown in Process 410. If this true, the scheduler 200 schedules Action 2 next, as shown in Process 420. If scheduler 200 determines that the (present time+action duration 330 of second action) is not less than (requested start time 320+slip time 340 of first action), the scheduler 200 next compares the priorities of the two Actions, as shown in Process 430. If the priority of Action 2 is higher than the priority of Action 1, then the scheduler 200 schedules Action 2 next, as shown in Process 420. Otherwise, the scheduler 200 schedules Action 1 next, as shown in Process 440. Finally, the queues are updated to reflect that one of the two Actions has been scheduled, as shown in Process 450. The algorithm is then repeated.

In other embodiments, the algorithm shown in FIG. 4 includes additional steps if the result of Process 410 is not true. In these embodiments, rather than comparing the priorities of the two actions, the scheduler 200 may then perform a second comparison where it determines whether (present time+action duration 330 of first action) is less than (requested start time 320+slip time 340 of second action). If this comparison is true, the scheduler 200 schedules the first action, as shown in Process 440. However, if (present time+action duration 330 of first action) is not less than (requested start time 320+slip time 340 of second action), then the scheduler has determined that one of the actions must fail. In this case, the scheduler 200 will schedule the higher priority action. If the actions are the same priority, the scheduler 200 may use some other criteria to determine which action to schedule.

Assume that the software stacks each present a queue of actions to the scheduler 200. Assume as well, that this queue is an ordered list, where the most important or time critical action is placed in the queue before a less important or less time critical action. FIG. 5 shows two queues, which may belong to a Bluetooth software stack 100 and a ZigBee software stack 110, respectively. Each queue contains 4 actions, which are ordered and include all of the information described above.

The scheduler 200 begins by comparing the items on the tops of the two queues. In this action, Bluetooth Action 1 has lower priority than ZigBee Action 1. However, Bluetooth Action 1 cannot complete before the latest allowable start time for the ZigBee Action 1. Therefore, the Bluetooth Action 1 must be scheduled after ZigBee Action 1. However, Bluetooth Action 1 has a slip time of 0. Therefore, because it cannot be scheduled immediately, Bluetooth Action 1 must fail.

The scheduler then compares the new item on the top of the Bluetooth software stack 100 (i.e. Bluetooth Action 2) to the ZigBee Action 1. Since Bluetooth Action 2 can complete before the latest allowable start time of ZigBee Action 1, it is scheduled before the ZigBee Action 1.

The scheduler then compares the new item on the top of the Bluetooth software stack 100 (i.e. Bluetooth Action 3) to the ZigBee Action 1. Since Bluetooth Action 3 can complete before the latest allowable start time of ZigBee Action 1, it is scheduled before the ZigBee Action 1.

The scheduler then compares the new item on the top of the Bluetooth software stack 100 (i.e. Bluetooth Action 4) to the ZigBee Action 1. Since Bluetooth Action 4 cannot complete before the latest allowable start time of ZigBee Action 1, ZigBee Action 1 is scheduled next.

The scheduler then compares the item on the top of the Bluetooth software stack 100 (i.e. Bluetooth Action 4) to the new item on the top of the ZigBee software stack 110 (i.e. ZigBee Action 2). Since Bluetooth Action 4 can complete before the latest allowable start time of ZigBee Action 2, Bluetooth Action 4 is scheduled next.

After this, the remainder of the items on the queue for the ZigBee software stack 110 are scheduled in order.

FIG. 5 also shows a timeline, indicating where each action in the two queues has been scheduled. Note that, by making use of slip time, action duration and requested start time, the scheduler 200 was able to successfully schedule seven of the eight actions in the two queues.

In contrast, a typical scheduler would have scheduled the ZigBee Action 1 first, due to its higher priority. However, this scheduling would have resulted in the inability to schedule the first 3 Bluetooth Actions.

Thus, the scheduler disclosed herein is an improvement over existing schedulers, in that it is able to more successfully schedule actions received from a plurality of network software stacks.

While FIG. 5 shows the scheduler 200 and the queues for each network software stack, in certain embodiments, the scheduler 200 does not have access to the actions in each of the queues. For example, the scheduler 200 may only have access to one action from each network software stack. Based on the rules enumerated above, the scheduler 200 selects one of the two actions to schedule next. Once that action is completed, the scheduler 200 selects again between the two actions at the top of the respective stacks. Furthermore, while FIG. 5 shows two network software stacks, it is understood that this concept can be extended to an arbitrary number of network software stacks and network protocols. In that case, the schedule performs the comparisons between all of the actions that are disposed on the top of their respective queues.

While the above disclosure describes operation of the scheduler 200 when the actions can reliably determine their duration, in some cases, this is not possible. During actual operation, actions may not be executed within their expected runtime. As an example, the CSMA algorithm used by ZigBee for transmitting packets uses a random backoff, and therefore it is not possible to predict how much time an incoming receive packet or outgoing transmit packet will consume. Consequently, the scheduler 200 may have to make a decision about what to do when an action overruns its allocated duration.

In certain embodiments, the scheduler 200 may simply allow any action that is in progress (i.e. an ongoing action) to continue to completion. In another embodiment, the scheduler 200 may determine the priority of the action which is being delayed by the ongoing action. If the delayed action has a higher priority than the ongoing action, the ongoing action is aborted, causing it to fail. The higher priority action is then scheduled to run in an effort to ensure that the highest priority action still executes when needed. If the delayed action does not have a higher priority, the ongoing action is allowed to complete.

Figure 6:
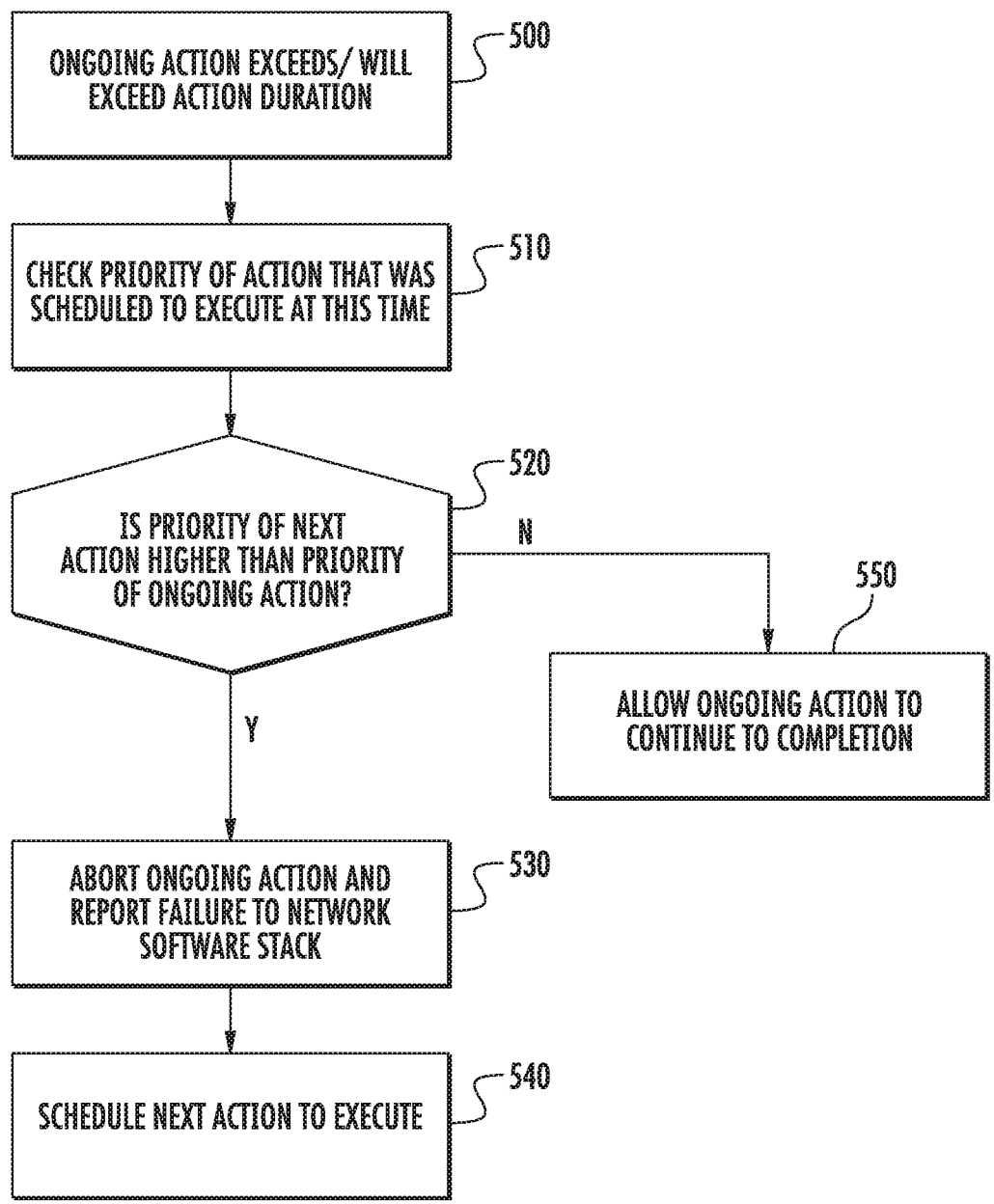
FIG. 6 illustrates a flowchart showing the pre-emptive nature of the scheduler.

FIG. 6 shows a flowchart showing this preemptive behavior of the scheduler 200. First, as shown in Process 500, the scheduler 200 determines that the ongoing action either has or will exceed its Action Duration. The scheduler 200 then checks the priority of the next action that is supposed to execute, as shown in Process 510. The priority of the next action is compared to that of the ongoing action, as shown in Process 520 If the next action has a greater priority, the scheduler 200 aborts the ongoing action and reports the failure to the network software stack, as shown in Process 530. The scheduler 200 then schedules the next action to execute, as shown in Process 540. If the next action does not have a greater priority than the ongoing action, the scheduler 200 allows the ongoing action to proceed to completion, as shown in Process 550.

Certain tasks may not have defined end times. In certain embodiments, these may be referred to as infinite tasks. For example, a ZigBee parent node may define an infinite task whereby the ZigBee radio waits for incoming packets to arrive. These infinite tasks have a low priority, such that they can be pre-empted by another action, as described above.

Thus, in one embodiment, the present disclosure describes a multi-protocol network controller 20, comprising a network interface 23, having a single radio 24. The multi-protocol network controller 20 also includes a plurality of network software stacks, which communicate with a scheduler 200. Each network software stack includes a queue of actions, where the action at the top of the queue is passed to the scheduler 200. The scheduler 200 utilizes information concerning expected duration, priority, requested start time and slip time to intelligently schedule actions from the plurality of network software stacks. This information is provided by the network software stacks.

In another embodiment, the present disclosure describes a software program, referred to as a scheduler. This software program may be stored in the memory device 22 and executed by the processing unit 21. In terms of data flow, this scheduler is disposed between two or more network software stacks and a hardware component, such as a network interface. Each network software stack has a queue of actions that it wishes to have executed by the hardware component. The scheduler uses information that is associated with the actions at the top of each queue to determine which action should be scheduled next. Unlike traditional schedulers which rely only on priority, the present scheduler uses additional information, such as action duration and slip time to more intelligently schedule the actions. The goal is to maximize the usage of the hardware components, while meeting the scheduling constraints of as many actions as possible.

In another embodiment, the present disclosure describes a method of scheduling actions for a common resource, such as a hardware component. The method includes presenting at least two actions to a scheduler, which is responsible for scheduling actions for the dedicated resource. Each action that is presented to the scheduler include additional information, such as Action Type, estimated Action Duration, Slip Time, requested Start Time, and priority. The scheduler then uses this information to intelligently select the next action to be scheduled to utilize the common resource. In certain embodiments, the scheduler may select an action that has a lower priority than another action.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A network controller, comprising:
   a network interface that comprises a radio;
   a processing unit; and
   a memory device, in communication with the processing unit, wherein the memory device comprises instructions, which when executed by the processing unit, enable the network controller to:
      compare actions from a plurality of network software stacks, wherein each action includes a requested start time, an estimated action duration, a slip time, and a priority;
      compute a latest allowable start time for a first action by summing the requested start time and the slip time of the first action;
      select one of the actions from the plurality of network software stacks, based on the requested start time, the estimated action duration, the slip time, and the priority of each action; and
      schedule the selected action to be executed by the network interface.

2. The network controller of claim 1, further comprising instructions which enable the processing unit to compare the latest allowable start time of the first action to a sum of the present time and the estimated action duration of a second action.

3. The network controller of claim 2, further comprising instructions which enable the processing unit to schedule the second action before the first action if the sum is less than the latest allowable start time.

4. The network controller of claim 3, further comprising instructions which, if the second action is not scheduled, enable the processing unit to compute a latest allowable start time for the second action by summing the requested start time and the slip time of the second action, and compare the latest allowable start time of the second action to a sum of the present time and the estimated action duration of the first action.

5. The network controller of claim 4, further comprising instructions which enable the processing unit to schedule the first action before the second action if the sum of the present time and the estimated action duration of the first action is less than the latest allowable start time of the second action.

6. The network controller of claim 2, further comprising instructions which enable the processing unit to schedule the second action before the first action if the priority of the second action is greater than the priority of the first action.

7. A method of scheduling actions from a plurality of network software stacks, comprising:
   comparing actions from a plurality of network software stacks, wherein each action includes a requested start time, an estimated action duration, a slip time, and a priority;
   computing a latest allowable start time for a first action by summing the requested start time and the slip time of the first action;
   selecting one of the actions from the plurality of network software stacks, based on the requested start time, the estimated action duration, the slip time, and the priority of each action; and
   scheduling the selected action to be executed by a network interface.

8. The method of claim 7, further comprising comparing the latest allowable start time of the first action to a sum of the present time and the estimated action duration of a second action.

9. The method of claim 8, further comprising scheduling the second action before the first action if the sum is less than the latest allowable start time.

10. The method of claim 9, further comprising:
    if the second action is not scheduled, computing a latest allowable start time for the second action by summing the requested start time and the slip time of the second action; and
    comparing the latest allowable start time of the second action to a sum of the present time and the estimated action duration of the first action.

11. The method of claim 10, further comprising scheduling the first action before the second action if the sum of the present time and the estimated action duration of the first action is less than the latest allowable start time of the second action.

12. The method of claim 8, further comprising scheduling the second action before the first action if the priority of the second action is greater than the priority of the first action.

13. A software program, disposed on a non-transitory storage medium, comprising instructions, which when executed by a processing unit:
    compare actions from a plurality of network software stacks, wherein each action includes a requested start time, an estimated action duration, a slip time, and a priority;
    compute a latest allowable start time for a first action by summing the requested start time and the slip time of the first action;
    select one of the actions from the plurality of network software stacks, based on the requested start time, the estimated action duration, the slip time, and the priority of each action;
    schedule the selected action to be executed by a network interface.

14. The software program of claim 13, further comprising instructions which enable the processing unit to compare the latest allowable start time of the first action to a sum of the present time and the estimated action duration of a second action.

15. The software program of claim 14, further comprising instructions which enable the processing unit to schedule the second action before the first action if the sum is less than the latest allowable start time.

16. The software program of claim 15, further comprising instructions which, if the second action is not scheduled, enable the processing unit to compute a latest allowable start time for the second action by summing the requested start time and the slip time of the second action, and compare the latest allowable start time of the second action to a sum of the present time and the estimated action duration of the first action.

17. The software program of claim 16, further comprising instructions which enable the processing unit to schedule the first action before the second action if the sum of the present time and the estimated action duration of the first action is less than the latest allowable start time of the second action.

18. The software program of claim 14, further comprising instructions which enable the processing unit to schedule the second action before the first action if the priority of the second action is greater than the priority of the first action.

* * * * *